Nov. 6, 1962 W. A. FLUMERFELT 3,062,572
SELF-LUBRICATING TIE ROD SOCKET ASSEMBLY
Filed Feb. 24, 1960
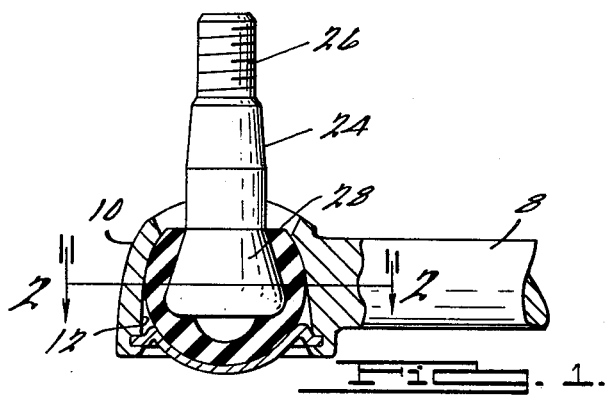
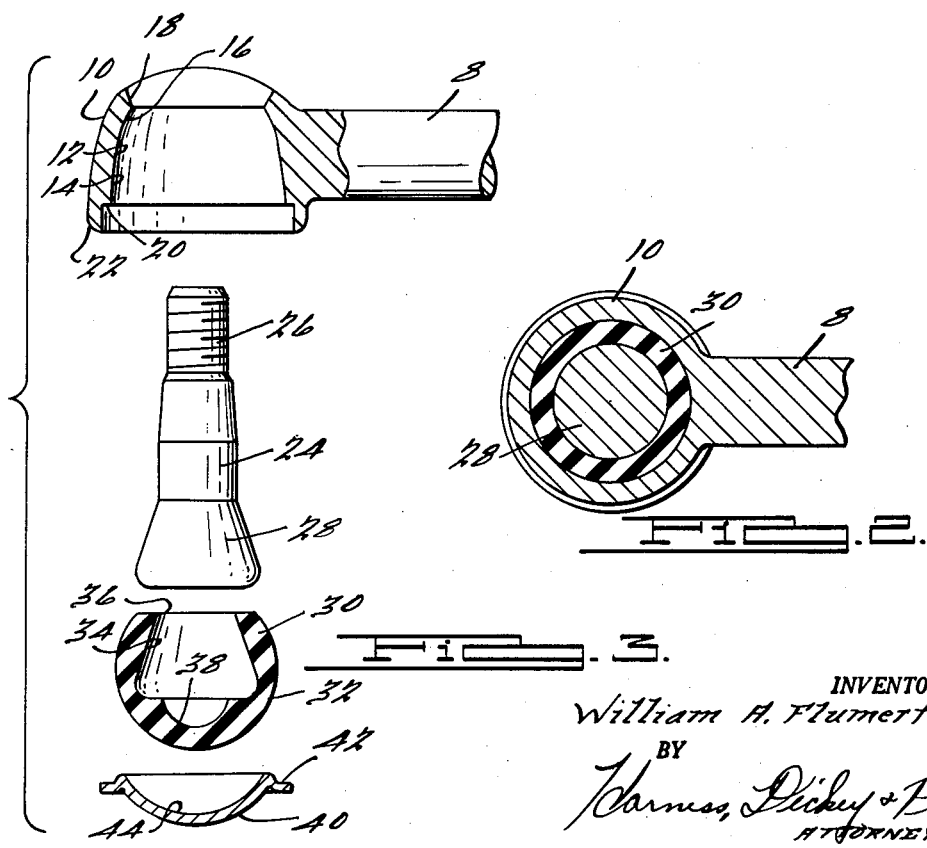
INVENTOR.
William A. Flumerfelt
BY
Harness, Dickey & Pierce
ATTORNEYS.

United States Patent Office 3,062,572
Patented Nov. 6, 1962

3,062,572
SELF-LUBRICATING TIE ROD SOCKET
ASSEMBLY
William A. Flumerfelt, Columbus, Ohio, assignor to The Columbus Auto Parts Company, Columbus, Ohio, a corporation of Ohio
Filed Feb. 24, 1960, Ser. No. 10,738
1 Claim. (Cl. 287—90)

This invention relates to joints of the type in which a stud is mounted for universal movement in a socket and, particularly, to a ball joint structure for use in automotive steering linkages.

It is an object of the present invention to provide a joint of the so-called greaseless type in which a bearing member is interposed between the stud and the socket wall which possesses high anti-friction character, provides its own lubrication, and eliminates the necessity for periodic lubrication of the joint.

It is another object of the present invention to provide a joint of the above character in which the bearing material utilized may be compressed to tightly engage the stud within the socket and which is endowed with automatic wear-compensating characteristics to maintain the tightness of fit through a long, useful life of the joint.

It is still another object of the present invention to provide a joint of the above character having improved bearing characteristics in which the bearing member has dual bearing surfaces, one of which functions during rotation of the stud and the other of which is effective to permit inclination or tilting of the axis of the stud.

It is a further object of the present invention to provide a joint which is operable to provide universal movement to the stud under predetermined load conditions, irrespective of rather broad dimensional variations in the size and configuration of the socket.

It is a still further object of the present invention to provide a joint assembly of the above character which is sturdy in construction, which may be conveniently assembled, which is inexpensive of manufacture, and eliminates the necessity for separate springs, which have heretofore been frequently used in joint assemblies intended for tie rod usage.

Other objects and advantages of the present invention will become apparent from the following detailed description, taken in conjunction with the accompanying drawings, wherein:

FIGURE 1 is a view, partly in elevation and partly in vertical section, showing a joint assembly made in accordance with the present invention and intended for use with a steering linkage on an automobile;

FIG. 2 is a sectional view of the structure illustrated in FIG. 1, taken along the line 2—2 thereof; and FIG. 3 is an exploded view of the parts shown in FIG. 1 prior to the assembly of said parts.

Referring now to the drawings, FIG. 1 illustrates a tie rod 8 having an enlarged housing portion 10 at one end thereof. The housing portion 10 is internally hollow to define a cavity 12 having a lower portion 14 of generally frusto-conical shape; that is, the cavity 12 increases in diameter toward the lower end thereof. The upper end of the cavity 12 curves inwardly rather sharply to define a segmentally spherical shoulder portion 16. The cavity 12 is completely open at its lower end and is provided with an enlarged aperture 18 at its upper end. Disposed adjacent the lower end of the cavity 12 is a shoulder 20 surrounded by a depending lip 22.

The housing portion 10 serves to support a stud 24 for limited universal movement. The stud 24 may be threaded at its one extremity 26 for the reception of a nut (not shown) or other fastener. The stud 24 is provided with a head 28 of frusto-conical shape and which tapers outwardly toward the free end thereof. The stud head 28 is disposed within the cavity 12 with a bearing member or ball insert 30 disposed between the head 28 and the wall defining the socket 12. The bearing 30 is exteriorly of a frusto-spherical shape and is provided with a frusto-conical socket 34 adapted to conformably receive the head 28 of the stud 24. As will be hereinafter explained, the bearing 30 is sufficiently elastic that the mouth 36 of the socket 34 may be sufficiently distorted to permit the insertion of the head 28 in the socket 34. Formed at the bottom of the socket 34 is a generally dish-shaped or segmentally spherical recess 38, which remains unoccupied upon the insertion of the head 28 in the socket 34.

As may be conveniently seen in FIG. 3, the stud 24 with the bearing 30 fitted over its head 28 is adapted to be inserted in the cavity 12 from the open lower end thereof so that the threaded extremity 26 of the stud projects upwardly above the housing 10. When in this position, a sheet metal concavo-convex closure member 40 may be forced upwardly against the bottom of the bearing 30 to compress the bearing 30 with the cavity 12 and against the sperical wall portion 16. The closure member 40 is provided with an annular, outturned peripheral flange 42, adapted to contact the shoulder 20 of the housing 10 and, when in this position, the lip 22 may be crimped or spun over the flange 42 to maintain the flange 42 in engagement with the shoulder 20 and thus lock the bearing 30 and the stud head 28 within the cavity 12. While the widest diameter of the head 28 is slightly less than the diameter of the aperture 18, the thickness added by the wall of the bearing 30, even when highly compressed, is sufficient to prevent movement of the head 28 out of the cavity 12 through the aperture 18.

In the assembled position, bearing support for the bearing 30 is provided partly by the segmentally spherical or concave inner face 44 of the closure member 40 which forms a seat for the lower portion of the bearing 30. Additional supporting contact with the bearing 30 is made at the segmentally spherical upper portion 16 of the cavity 12. The spherical wall portion 16 and the inner face 44 of the closure 40 are disposed on a common sphere having a center coincidental with the center of the bearing 30. Thus, the bearing 30 is free to revolve in any direction to permit tilting or inclination of the axis of the stud 24. In practice, the joint illustrated in the drawings permits inclination of the stud twenty-eight degrees from its normal centered position or a movement through a total included angle of fifty-six degrees, which is more than enough to meet the requirements of the steering linkages for which it is intended to be used.

It will be noted that not only is the bearing 30 free to move within the housing, but the stud 24 is free to rotate within the bearing, thus providing a dual bearing action. Thus, upon rotation of the stud 24, it is possible that the stud head 28 will move within and relative to the bearing 30, or that the bearing 30 will move within the cavity 12, or that both actions will occur.

As is well known in the art, the tie rod 8 and its housing 10 may be formed from steel or other suitable material. The stud 24 may also be formed from steel and may be inexpensively fabricated, as by cold heading. In particular, it has been found that the frusto-conical or tapered head 28 of the stud 24 may be less expensively formed on the stud 24 than the segmentally spherical or ball heads which are formed on many studs utilized in ball joint constructions. The bearing 30 is desirably molded from a synthetic elastomer, such as a urethane rubber composition having an additive to reduce friction, such as molybdenum di-sulfide, graphite or the like. Examples of such substances are Adiprene C and Vulkollan 30, which possesses great tensile strength, elasticity, resistance to wear and tear, and has a low coefficient of friction. The material may be highly compressed over long periods of time, yet will retain its elasticity to maintain a tight fit between the stud head 28, the wall of the cavity 12 and closure seat 44. The material of the bearing 30 will flow or move within the cavity in a manner tending to tightly engage all portions of the side of the head 28 and, when subjected to great compression, will flow into the space normally left by the cavity 38. It has been found that the formation of the cavity 38 enhances the springiness of the bearing 30 when compressed by the closure member 40, and also provides a place into which the material of the bearing 30 may flow when subjected to excessive compression due to the cavity 12 being slightly undersize or the bearing being slightly oversize. Furthermore, if the bearing surfaces of the cavity 12 and closure seat 44 are somewhat out of round, the cavity 38 provides a space into which the material of the bearing 30 may flow when subjected to localized excessive pressures on inclination of the stud 24 to its normal axis.

In view of the compressibility of the bearing 30 and the provision of the recess 38 into which portions of the material of the bearing 30 may flow, relatively liberal dimensional tolerances may be provided in the manufacture of the cavity 12 and the bearing 30. When the inner and outer bearing surfaces of the bearing 30 tend to wear slightly, it has been found that the compressed material of the bearing 30 will expand to automatically compensate for such wear and maintain the desired tight fit between all parts of the joint.

While it will be apparent that the preferred embodiment herein illustrated is well calculated to fulfill the objects above stated, it will be appreciated that the invention is susceptible to modification, variation and change without departing from the proper scope or fair meaning of the subjoined claim.

What is claimed is:

In a flexible joint construction, a housing member having an open-ended cavity provided with a substantially segmentally spherical shoulder at the end thereof opposite from its open end, a stud having a frusto-conical head disposed within said cavity, an elastomeric bearing member in said cavity having a segmentally spherical outer periphery engageable with said shoulder and a socket within which said head is disposed, said socket having a frusto-conical side wall conformably engaging one wall of said head and a bottom wall engaging the free end of said head over a generally annular area thereof, said bottom wall having a central recessed portion providing an opening between the free end of said head and the material of said bearing opposite thereto, and a closure member secured to said housing for enclosing the open end of said cavity, said closure member having a segmentally spherical seat engaging the outer periphery of said bearing member and cooperating with said cavity shoulder in holding said bearing member under compression against said head.

References Cited in the file of this patent

UNITED STATES PATENTS

| | | |
|---|---|---|
| 2,110,148 | Gross | Mar. 8, 1938 |
| 2,274,417 | Katcher | Feb. 24, 1942 |
| 2,755,116 | Alldredge | July 17, 1956 |
| 2,862,740 | Alexander | Dec. 2, 1958 |

FOREIGN PATENTS

| | | |
|---|---|---|
| 1,091,445 | France | Oct. 27, 1954 |

OTHER REFERENCES

The publication "Polyurethanes," by Bernard A. Dombrow (pages 106, 107, 112, 119), 1957, by Reinhold Publishing Corp., New York. (Copy in Div. 50.)